No. 804,111. PATENTED NOV. 7, 1905.
P. H. FULLER.
VEHICLE BRAKE.
APPLICATION FILED FEB. 28, 1905.

2 SHEETS—SHEET 1.

Witnesses

Peter H. Fuller,
Inventor,
by C. A. Snow & Co.
Attorneys

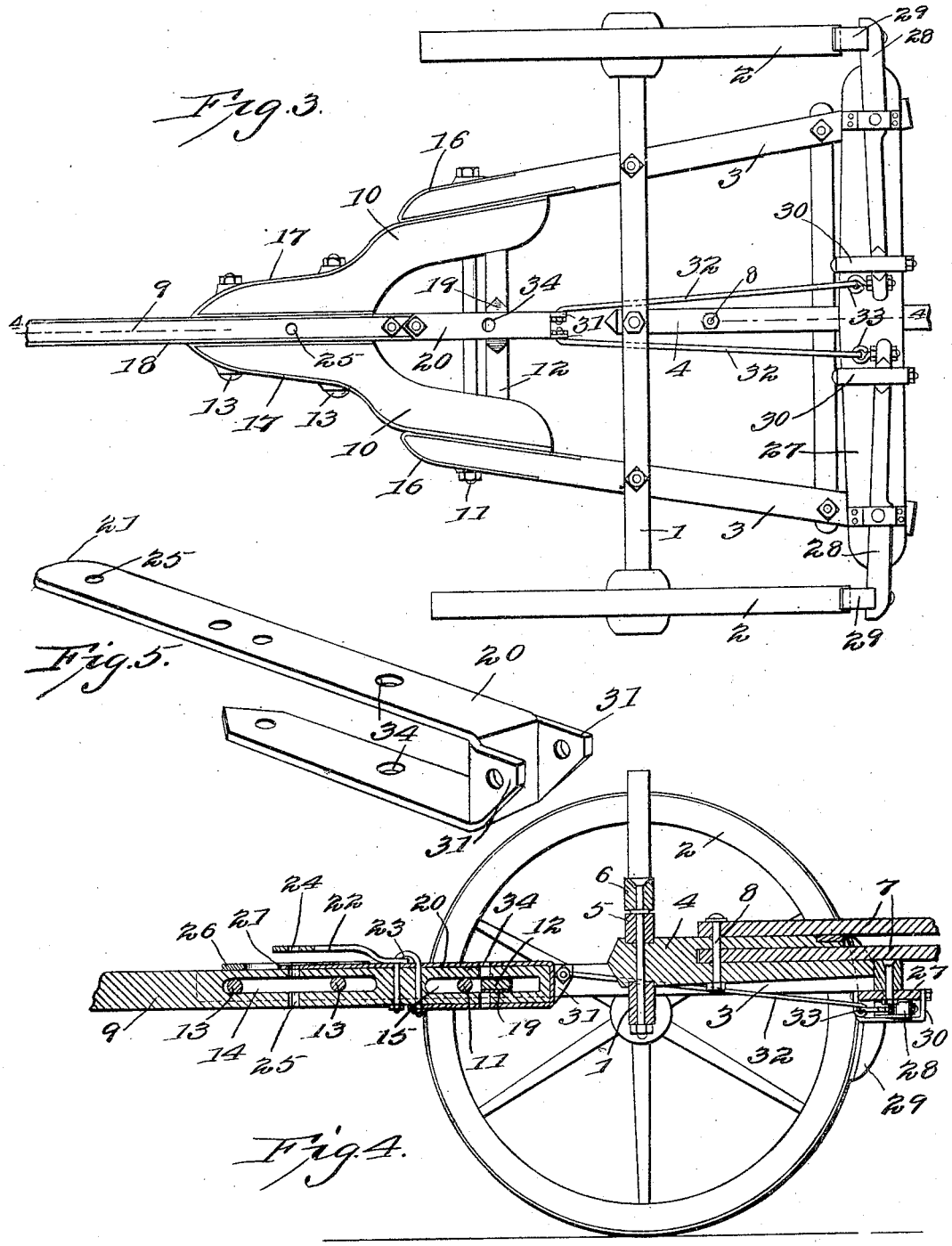

UNITED STATES PATENT OFFICE.

PETER H. FULLER, OF PICTURE ROCKS, PENNSYLVANIA.

VEHICLE-BRAKE.

No. 804,111.  Specification of Letters Patent.  Patented Nov. 7, 1905.

Application filed February 28, 1905. Serial No. 247,690.

*To all whom it may concern:*

Be it known that I, PETER H. FULLER, a citizen of the United States, residing at Picture Rocks, in the county of Lycoming and State of Pennsylvania, have invented a new and useful Vehicle-Brake, of which the following is a specification.

This invention relates to brakes for vehicles; and it has particular reference to that class of vehicle or wagon brakes which are automatic in their action, so that on a downgrade the brakes will be set by the holdback action of the draft-animals against the forward movement of the vehicle.

The present invention has for its object to simplify and improve the construction and operation of this class of devices; and with these and other ends in view, which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
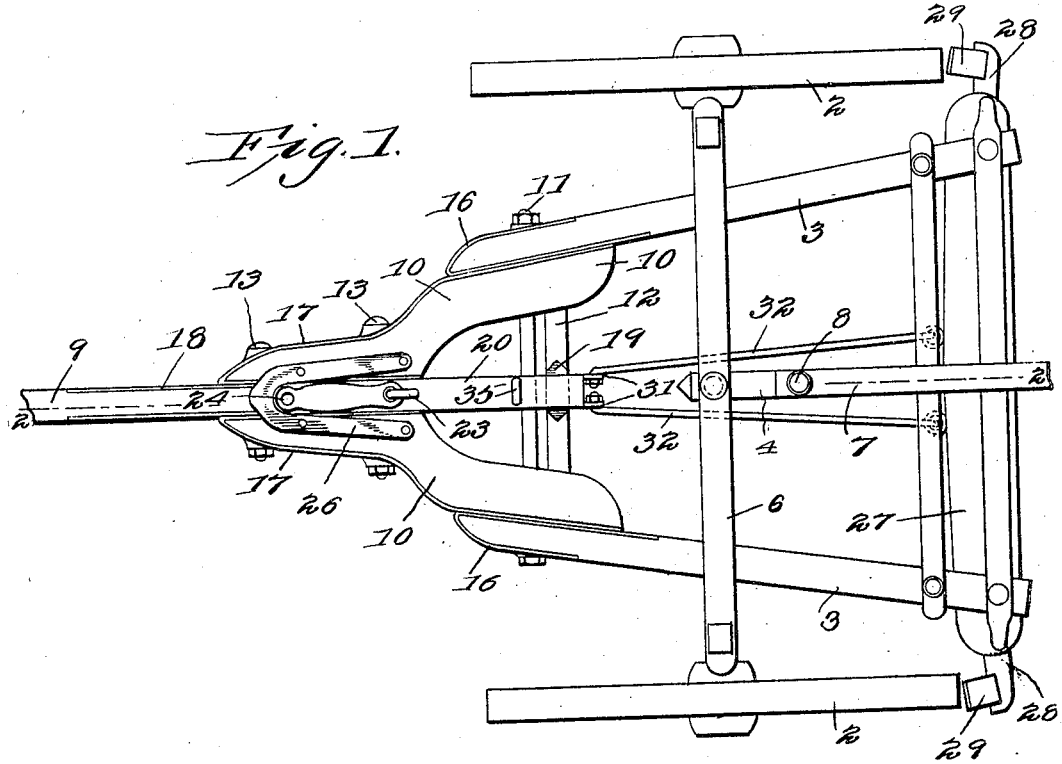
Figure 2:
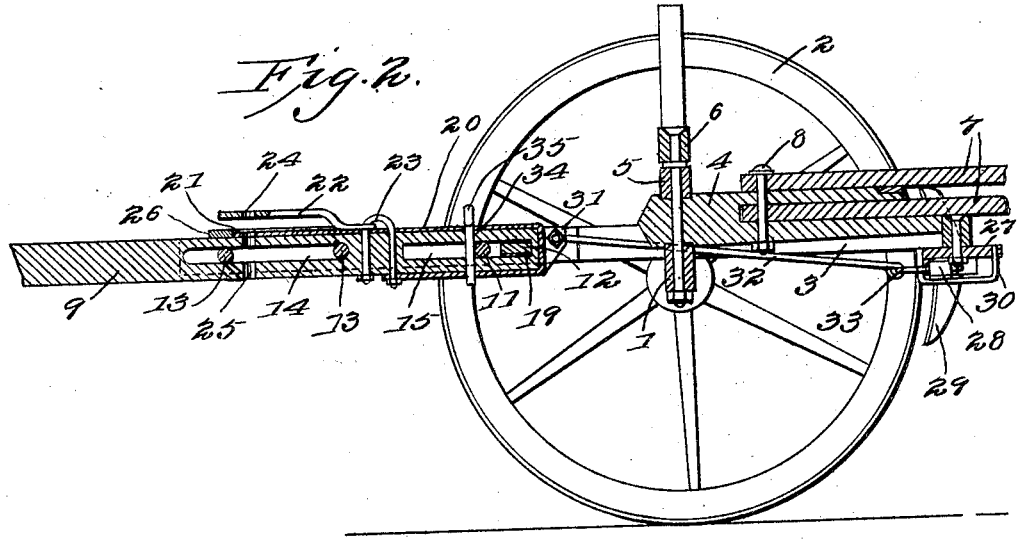

In said drawings, Figure 1 is a top plan view of the front part of a vehicle running-gear equipped with the invention, the brakes being shown out of operation. Fig. 2 is a longitudinal sectional view taken on the line 2 2 in Fig. 1. Fig. 3 is a bottom plan view showing the brakes set. Fig. 4 is a longitudinal sectional view showing the parts in the position indicated in Fig. 3 and taken on the line 4 4 in the latter figure. Fig. 5 is a perspective detail view of the tongue-iron.

Corresponding parts in the several figures are indicated throughout by similar characters of reference.

The present invention is applicable to various kinds of wagons and vehicles, and it is used in connection with the front running-gear, although within the scope of the invention the brake-operating members might be extended to operate in conjunction with brake members engaging the hind wheels. In the accompanying drawings, however, the invention is illustrated as applied to a front running-gear, which may be briefly described as including the axle 1, transporting-wheels 2 2, hound members 3 3, front reach member 4, stationary bolster 5, and pivoted bolster 6. It is to be distinctly understood that the construction and arrangement of all these parts may be varied and that they may be detracted from or added to within the scope of the invention.

7 designates the bifurcated forward end of the reach, which is pivotally connected by a bolt 8 with the reach member 4.

The tongue 9 is provided with hound members 10 10, which are fitted between the hound members 3 3 of the running-gear, with which they are pivotally connected by a bolt 11, in rear of which the hound members 10 10 are spaced and braced by means of a cross-piece 12. The tongue 9 is connected slidably with the hound members 10 10 by means of bolts 13 13, operating in a slot 14, which is formed longitudinally in the tongue. The latter is provided with an additional slot 15, engaging the pivotal bolt 11 and the cross-brace 12, with relation to both of which the said tongue is longitudinally slidable. The hound members 3 3 and 10 10, as well as the tongue 9, are shod with metallic straps 16, 17, and 18, forming wear-surfaces, which may be lubricated when desired to enable the parts to move freely with relation to each other. The cross-bar 12, which is recessed to engage the tongue, is likewise provided upon its upper and lower sides with bearing-plates 19 to take up wear.

The rear end of the tongue is provided with a U-shaped iron 20, the arms of which are of a width equal to that of the tongue, with the upper and lower sides of which said arms are in engagement, the upper arm being extended forwardly to form an abutment 21. A hammer-strap 22 is connected with the tongue by means of a clip 23, said hammer-strap being provided with a perforation 24, registering with perforations 25 in the tongue for the passage of the hammer-bolt. An approximately U-shaped buffer-iron 26 is mounted upon and serves to connect the hound members 10 10, said buffer-iron being extended across the tongue, as shown, directly in the path of the abutment 21. The proportions of the various parts are preferably of such a character that when the abutment 21 is in contact with the buffer-plate 26 the rearward connecting-bolt 13 and the cross-bar 12 shall be in engagement with the rear ends of the slots 14 and 15, respectively. This is the position assumed when draft is applied to the tongue, and the parts will thus be reinforced and strengthened with relation to each other.

A cross-bar 27, which may be connected with and supported by the hound members 3 of the running-gear, serves to support the brake-levers 28, the outer ends of which carry the shoes 29, engaging the wheels 2, and the inner ends of which are guided in straps 30. The tongue-iron 20 is provided at its rear end with vertically-disposed perforated lugs 31, which are connected by means of links 32 with eyebolts 33 at the inner ends of the brake-levers. The links 32 are in the nature of stiff rods or bars, the forward ends of which are pivotally connected with the perforated ears 31.

The tongue 9 is provided near its rear end with a perforation 34, intersecting the slot 15. When draft is applied to the tongue and the latter is in the position best seen in Fig. 2 of the drawings, a pin or bolt 35 may be dropped through the perforation 34 in front of the pivotal bolt 11, with which the pin or bolt 35 will then be in contact. By this means the tongue will be prevented from moving rearwardly to set the brakes.

From the foregoing description, taken in connection with the drawings hereto annexed, the operation and advantages of this invention will be readily understood. Ordinarily the bolt or pin 35 will not be used, but will be kept in some convenient place where it will be readily accessible. When draft is applied to the tongue, the latter slides forwardly, as indicated in Figs. 1 and 2, until the abutment 21 at the front end of the tongue-iron contacts with the buffer-iron 26, while the rear ends of the slots 14 and 15 engage the rear bolt 13 and the cross-piece 12, respectively. At the same time the inner ends of the brake-levers 28 will be moved forwardly by the links 32, thus moving the brake-shoes out of possible contact with the wheels 2. When, as on a downgrade, the draft-animals hold back, the vehicle will roll forward, and the relative position of parts illustrated in Figs. 3 and 4 will be assumed, the tongue moving back between the hound members and pushing the inner ends of the brake-levers in a rearward direction through the intermediate links 32, the brakes being thus set and the progress of the vehicle arrested or checked. If it shall be desired to back the wagon, the pin or bolt 35 is dropped into position, as clearly shown in Fig. 2, and the tongue will thus be held safely against rearward movement.

This device, as will be seen, is very simple in construction and operation, and it may at small expense be applied to most running-gears of ordinary construction.

Having thus described the invention, what is claimed is—

1. A running-gear having hound members, tongue-hounds pivotally connected therewith, a cross-brace connecting and spacing the tongue-hounds, a tongue connected slidably with and supported by the tongue-hounds and cross-bar, a tongue-iron engaging the upper and lower sides and the rear end of the tongue and extended forwardly to form an abutment, and a U-shaped buffer member supported upon the tongue-hounds and disposed in the path of said abutment.

2. A running-gear having hound members, tongue-hounds connected pivotally therewith, a tongue supported slidably between the tongue-hounds, a tongue-iron engaging the upper and lower sides and the rear end of the tongue and extended forwardly to form an abutment, a buffer member connected with the tongue-hounds and extending across the tongue in the path of the abutment, pivotally-supported brake-levers, and connecting means between said brake-levers and the tongue-iron.

3. A running-gear having hound members, tongue-hounds connected pivotally therewith, a tongue supported slidably between the tongue-hounds, a tongue-iron engaging the upper and lower sides and the rear end of the tongue and having rearwardly-extending vertically-disposed ears, pivotally-supported brake-levers, and link-rods pivotally connecting said brake-levers with the ears of the tongue-iron.

4. A running-gear having hound members, tongue-hounds, a bolt connecting the tongue-hounds pivotally with the hounds of the running-gear, a cross-bar connecting and spacing the tongue-hounds, a tongue supported slidably between the tongue-hounds and having a slot engaging the cross-bar and the pivotal bolt and a vertical aperture intersecting said slot, a tongue-iron engaging the upper and lower sides and the rear end of the tongue and extending forwardly to constitute an abutment, a buffer member connecting the tongue-hounds and disposed in the path of the abutment, pivotally-supported brake-levers, rods connecting said levers with ears at the rear end of the tongue-iron, and a locking-pin adapted for engagement with the vertical aperture in the tongue when the latter is in its forward position, thereby engaging the pivotal bolt and obstructing rearward movement of the tongue.

In testimony that I claim the foregoing as my own I have hereto affixed my signature in the presence of two witnesses.

PETER H. FULLER.

Witnesses:
C. W. BURROWS,
H. JEANNETTE SPENCER.